(12) United States Patent  (10) Patent No.: US 8,007,284 B2
Smith                      (45) Date of Patent:     Aug. 30, 2011

(54) MOISTURE PROOF TELESCOPING COUPLER ASSEMBLY FOR ELECTRIC METAL TUBES WITH ENHANCED GROUNDING, SEALING, AND CONTINUITY

(75) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 12/800,162

(22) Filed: May 10, 2010

(65) Prior Publication Data

US 2010/0218992 A1    Sep. 2, 2010

Related U.S. Application Data

(63) Continuation-in-part of application No. 12/456,467, filed on Jun. 17, 2009, which is a continuation-in-part of application No. 12/080,201, filed on Apr. 1, 2008, now Pat. No. 7,563,100, application No. 12/800,162, which is a continuation-in-part of application No. 12/658,478, filed on Feb. 9, 2010.

(51) Int. Cl.
    *H01R 41/00* (2006.01)
(52) U.S. Cl. .......................................... 439/32
(58) Field of Classification Search .................. 439/32, 439/33, 100
    See application file for complete search history.

(56) References Cited

U.S. PATENT DOCUMENTS

| | | |
|---|---|---|
| 268,686 A | 12/1882 | Kaiser |
| 1,759,567 A | 5/1930 | Dibner |
| 2,900,426 A | 8/1959 | Appleton |
| 3,154,632 A | 10/1964 | Browne |
| 3,204,988 A | 9/1965 | Ouderkirk |
| 3,389,923 A | 6/1968 | Love, Jr. |
| 3,454,291 A | 7/1969 | Goldsobel |
| 3,885,821 A | 5/1975 | Philbert |
| 3,951,436 A | 4/1976 | Hyde |
| 3,976,314 A | 8/1976 | Graham |
| 4,073,514 A | 2/1978 | Pote |
| 4,091,523 A | 5/1978 | Rieche |
| 4,304,424 A | 12/1981 | Hansen |
| 4,438,954 A | 3/1984 | Hattori |
| 4,655,462 A | 4/1987 | Balsells ...................... 277/164 |
| 5,141,258 A | 8/1992 | Stine |

(Continued)

OTHER PUBLICATIONS

O-Z/Gedney, Brochure, Expansion Fittings with Integral Bond, May 2007, 1 page.

(Continued)

*Primary Examiner* — Phuong K Dinh
(74) *Attorney, Agent, or Firm* — Fattibene and Fattibene LLC; Paul A. Fattibene

(57) ABSTRACT

A moisture proof, telescoping coupler assembly for electric metal tubes and threaded rigid pipe with an enhanced grounding arrangement both internally and externally for electrically grounding and bonding the telescoping tube to the coupler body and improved continuity. A high conductivity metal plating on an internal cantered spring improves continuity and lowers voltage drop. Moisture proof sealing is improved by centering the electric metal tube within the coupler body adjacent the seal preventing possible leaking after securing the electric metal tube to one end. A modified arrangement utilizes a snap fitting retaining ring for securing an electric metal tube to the coupler body to provide for unidirectional insertion of an electric metal tube into the open end of a coupler body in a manner that prohibits unintentional separation of the tube and/or retainer ring from the coupler body.

16 Claims, 10 Drawing Sheets

U.S. PATENT DOCUMENTS

| | | |
|---|---|---|
| 5,364,281 A | 11/1994 | Leto |
| 5,466,890 A | 11/1995 | Stagnilti |
| 5,654,526 A | 8/1997 | Sharp |
| 6,106,031 A | 8/2000 | Guginsky |
| 6,663,145 B1 * | 12/2003 | Lyall et al. ............. 285/340 |
| 6,715,803 B1 | 4/2004 | Pahl |
| 6,765,143 B2 | 7/2004 | Kiely |
| 6,913,292 B2 * | 7/2005 | Snyder et al. ............. 285/340 |
| 7,111,873 B1 | 9/2006 | Cougle |
| 7,563,100 B1 * | 7/2009 | Smith ............................. 439/33 |
| 2008/0102660 A1 | 5/2008 | Wittwer |
| 2009/0258520 A1 | 10/2009 | Smith ............................. 439/271 |

OTHER PUBLICATIONS

Appleton, Brochure, Expansion Fittings with Integral Bond, May 2007, 1 page.

Thomas & Betts, Brochure, T&B Fittings, Undated, 1 page.

Appleton, Brochure, Rigid Metal Conduit Expansion Couplings, Sep. 2005, pp. 2 and 31.

* cited by examiner

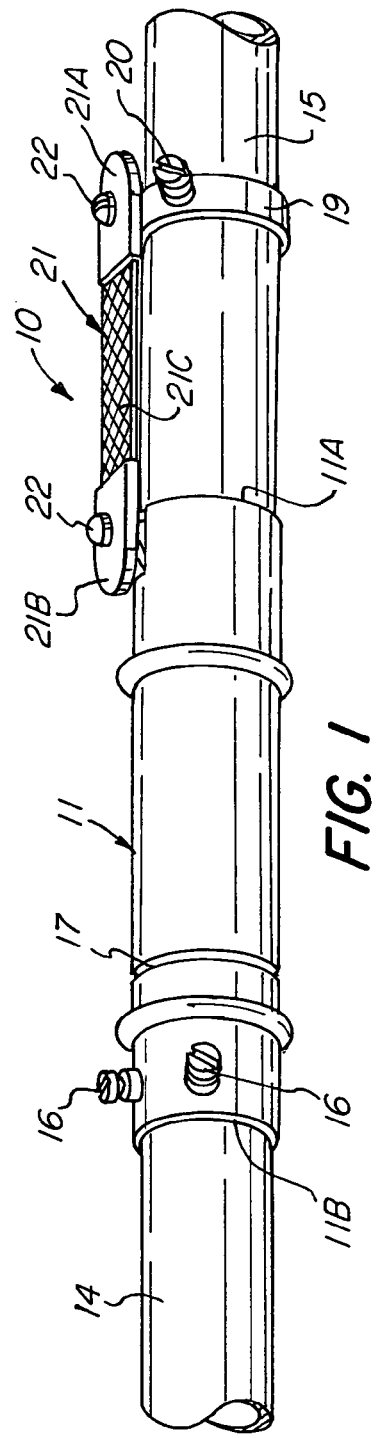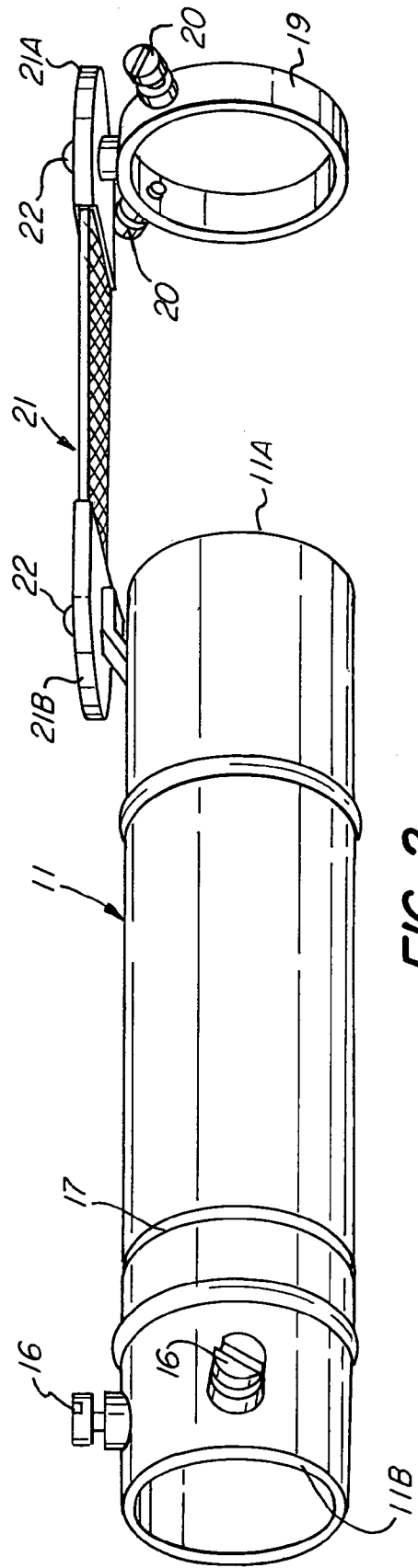

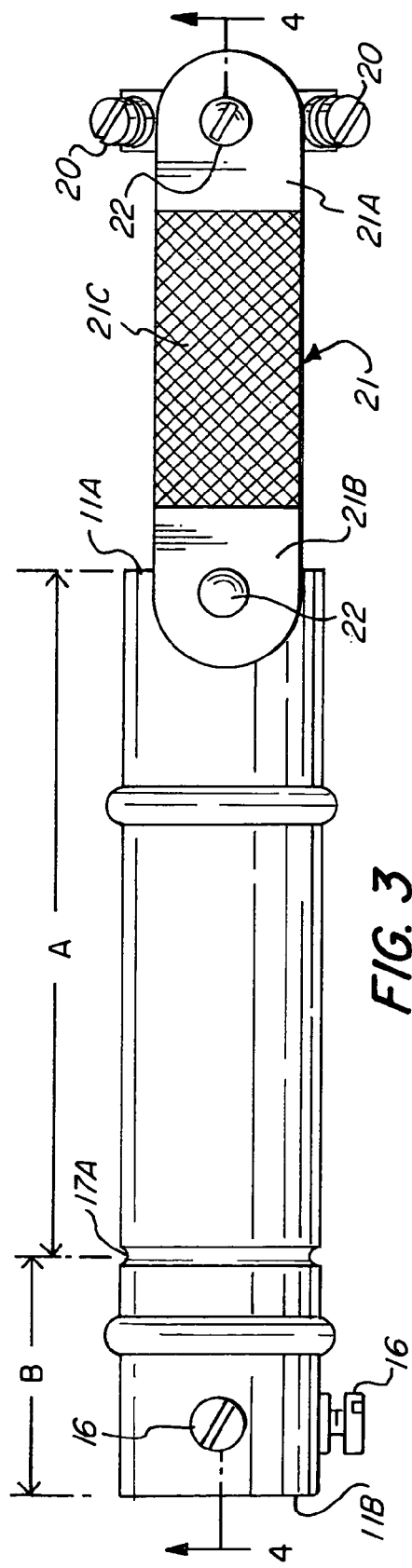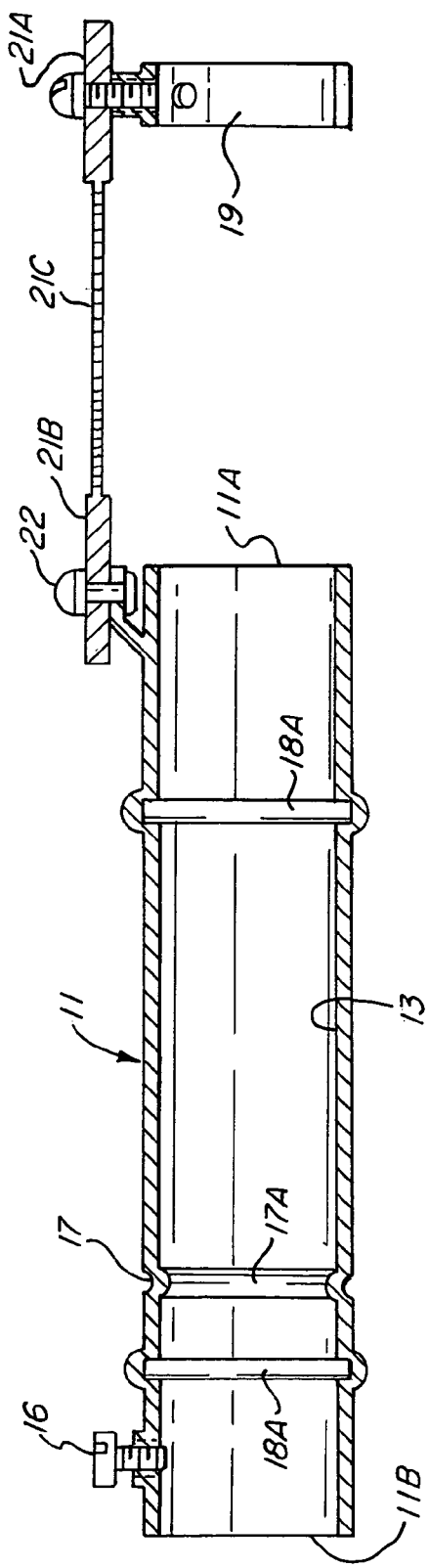
FIG. 3
FIG. 4

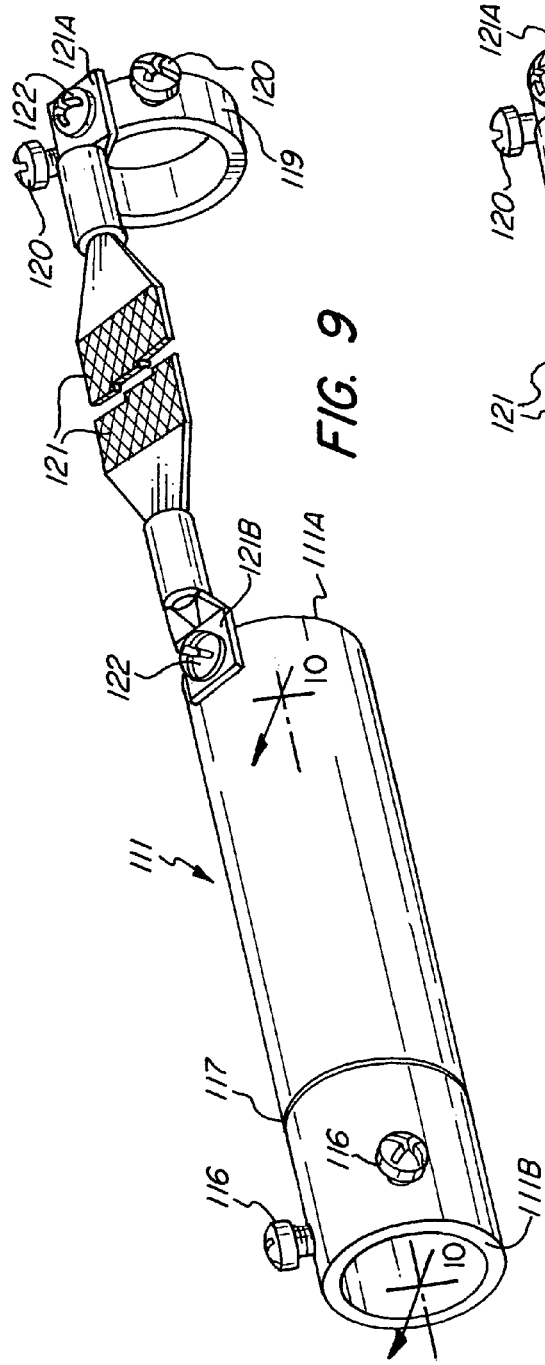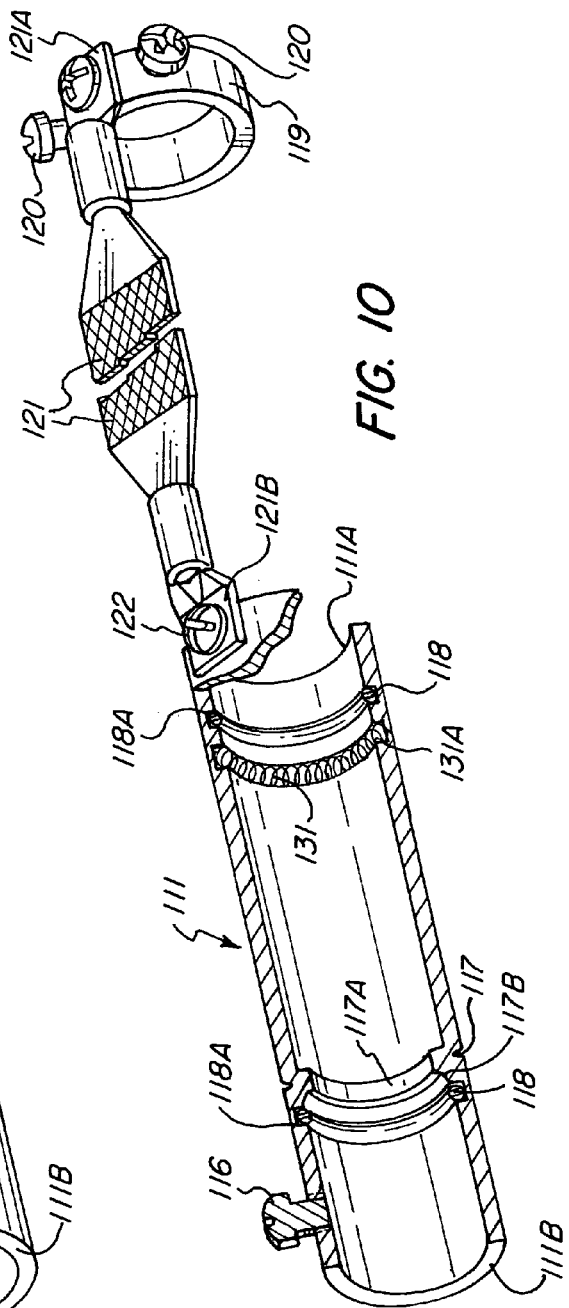

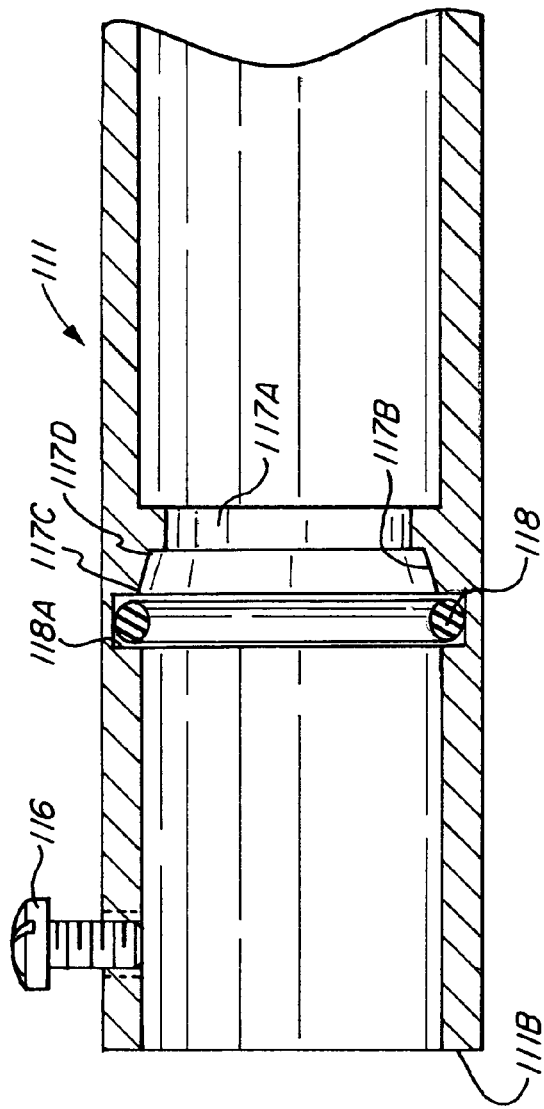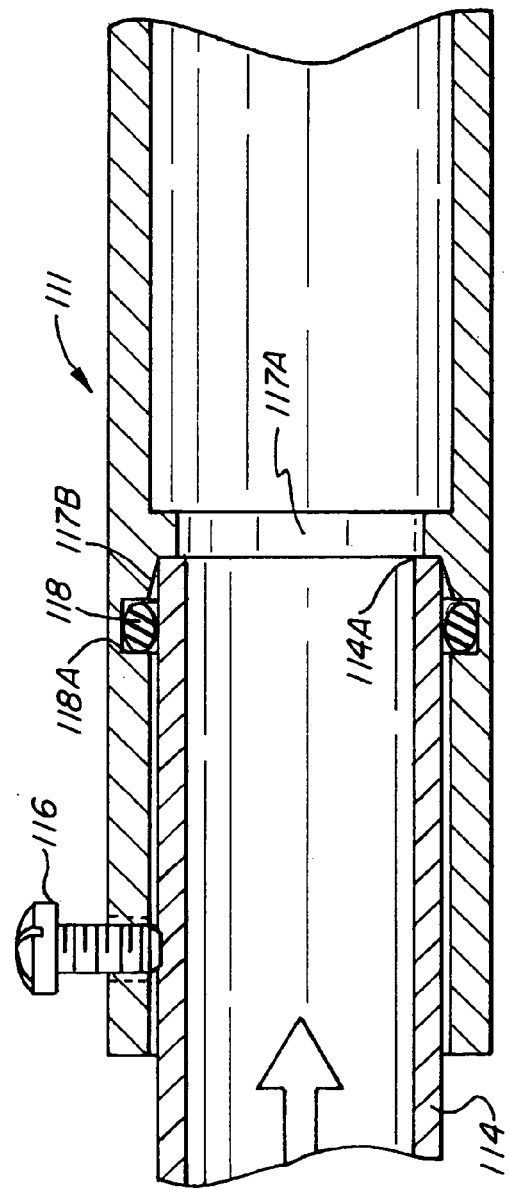

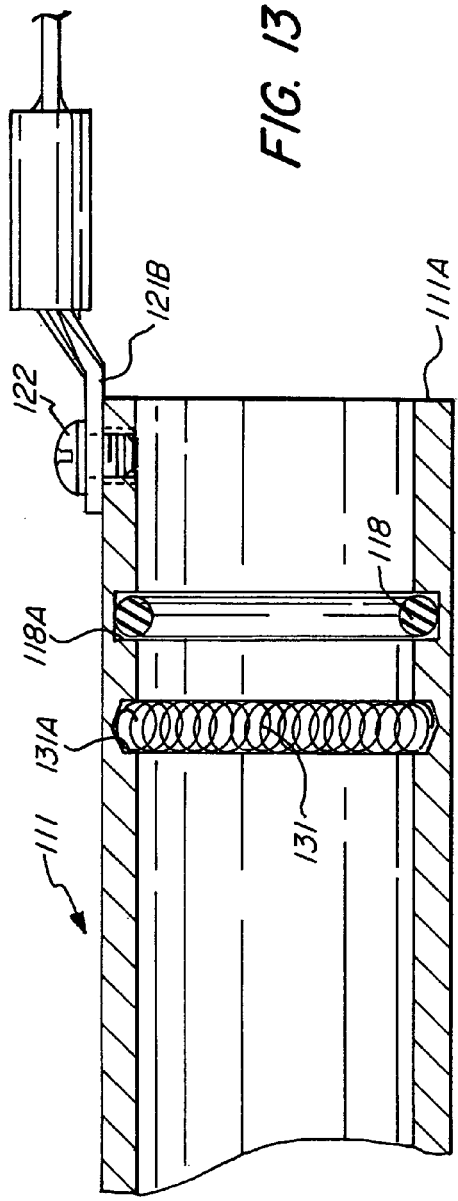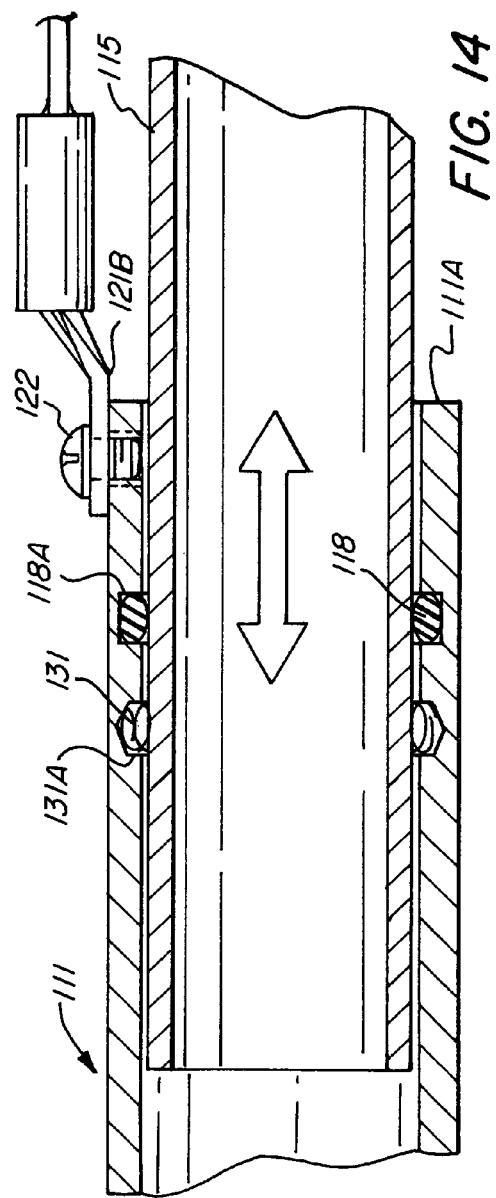

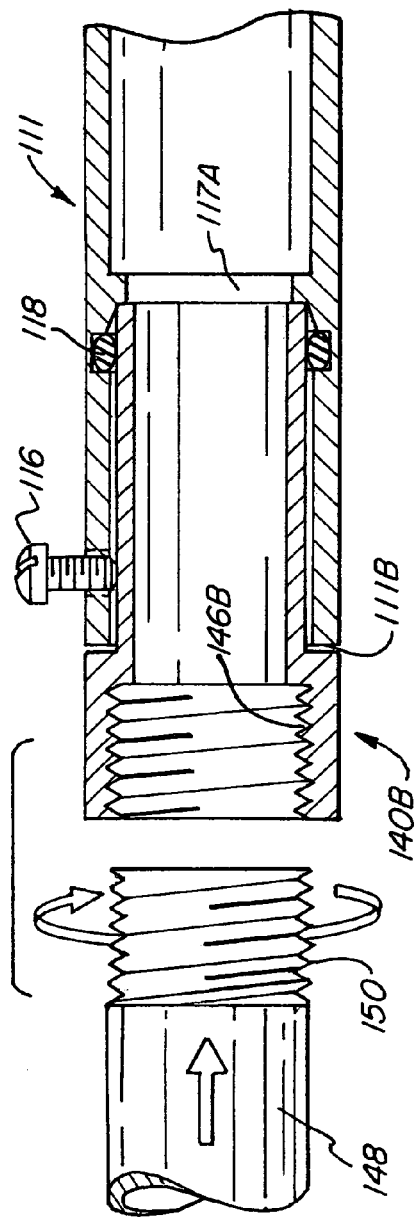
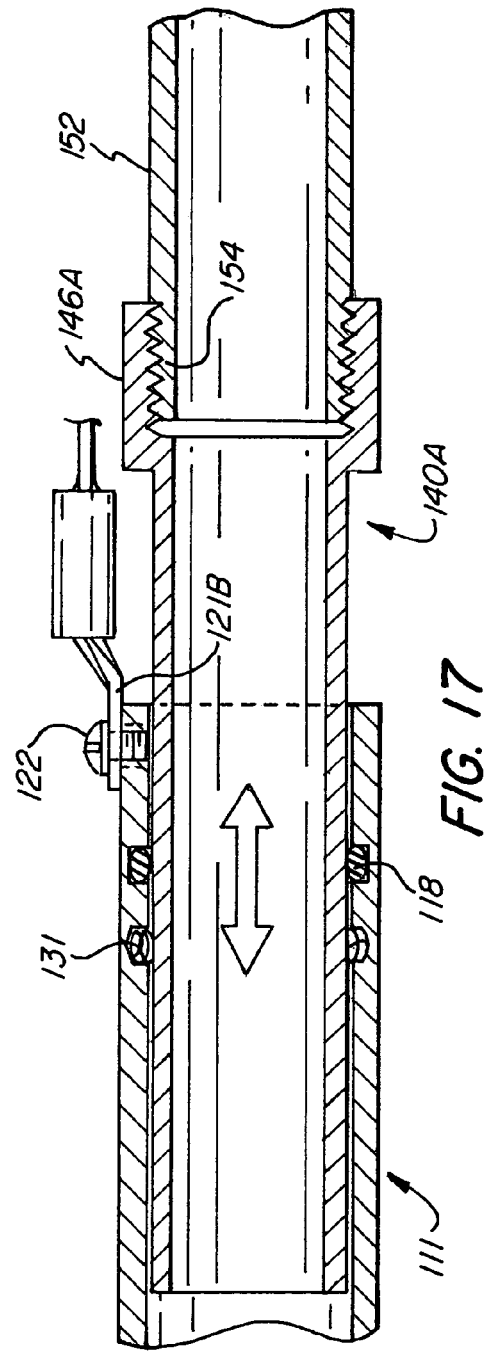

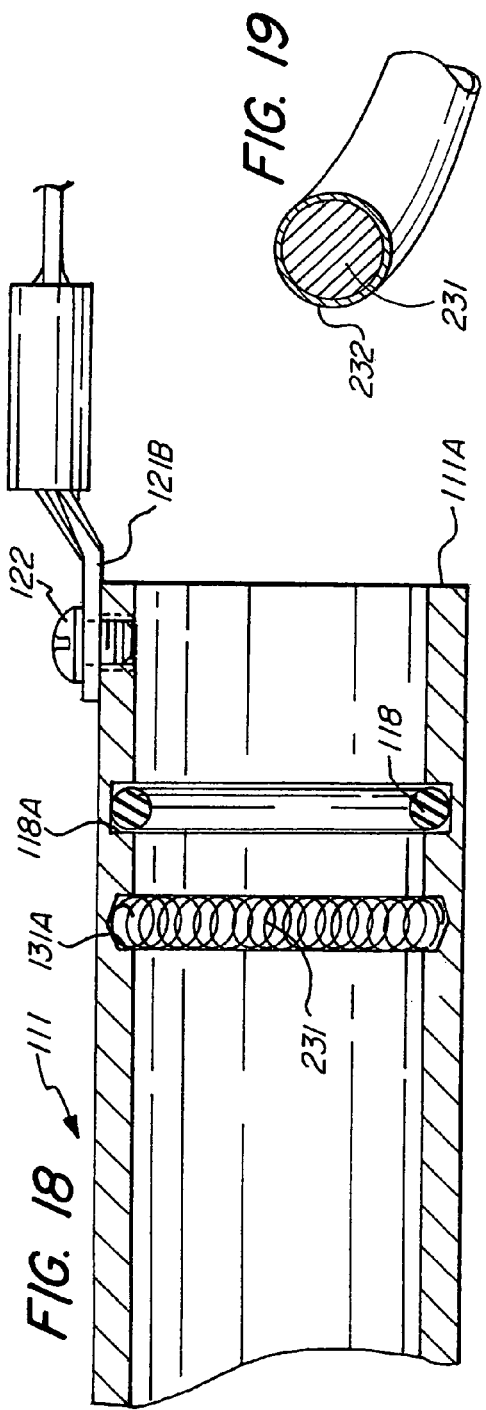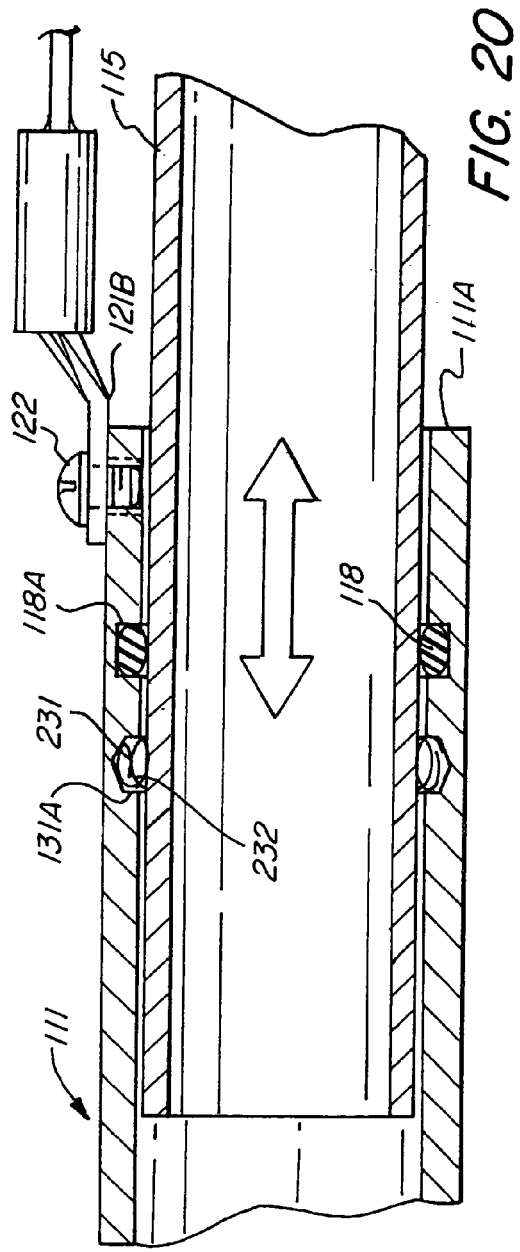

MOISTURE PROOF TELESCOPING COUPLER ASSEMBLY FOR ELECTRIC METAL TUBES WITH ENHANCED GROUNDING, SEALING, AND CONTINUITY

RELATED APPLICATIONS

This application is a continuation-in-part of application Ser. No. 12/456,467 filed Jun. 17, 2009, which is a continuation-in-part of application Ser. No. 12/080,201 filed Apr. 1, 2008, now U.S. Pat. No. 7,563,100; and is a continuation-in-part of application Ser. No. 12/658,478 filed Feb. 9, 2010, all of which are herein incorporated by reference.

FIELD OF THE INVENTION

This invention is generally directed to an expansion or telescoping coupler assembly for electrical metal tubes and more specifically to a moisture proof telescoping or expanding coupler assembly with an enhanced electrical grounding arrangement for coupling an electric metal tube that is in relative sliding relationship to a coupler body, and providing enhanced continuity.

BACKGROUND OF THE INVENTION

There exist various known types of coupler fittings for attaching an electric metal tube (EMT) to an electrical installation such as an electric box or panel or for joining at least two electrical metal tubes in an end-to-end relationship. Such known coupler assemblies include a coupler body to which the electrical metal tubes are rigidly connected to the coupler body, e.g. as disclosed in U.S. Pat. Nos. 268,686; 3,976,314; 4,073,514; 4,091,523. Other known coupler assemblies include a coupler body wherein at least one connected electrical metal tube is permitted to telescope or slide relative to the coupler body or relative to another electrical metal tube fixedly connected to the coupler body, e.g. as disclosed in U.S. Pat. Nos. 5,141,258 and 6,715,803.

With respect to such known sliding or telescoping coupler assemblies, it has been noted that because of the relatively free or sliding relationship between the moveable electrical metal tube relative to the coupler body, the optimal electrical grounding effect therebetween is substantially diminished because of insufficient contact between the complementary surfaces of the movable electrical metal tube and the associated coupler body due to the required tolerance necessary to permit the desired telescoping between the moveable electric tube and the associated coupler body. Thus, the optimum desired amount of the electrical grounding effect therebetween is not achieved.

Additionally, problems have been encountered in grounding being diminished or compromised over time resulting in poor grounding. Additionally, movement of conduits or electric metal tubing during securing of the electric metal tubing has often led to poor sealing.

Efforts have also been made to improve continuity in electrical fittings or connectors. Nearly all of these efforts have been directed to increasing contact surface area. For example, U.S. Pat. No. 6,709,280 entitled "Fitting with Improved Continuity" issuing Mar. 23, 2004 to Gretz. Therein disclosed is a fitting for connecting a cable to an electrically conducting junction box having a sloped grounding tang in which the downward slope causes the fitting to be drawn tightly against the junction box wall. Another fitting is disclosed in U.S. Pat. No. 6,780,029 entitled "High Continuity Electrical Fitting" issuing Aug. 24, 2004 to Gretz. Therein disclosed is a fitting for connecting a cable to an electrically conducting junction box that has larger grounding tangs providing much greater surface contact area, thereby improving continuity and lowing millivolt drop.

While these prior techniques improve continuity they have done so by increasing surface area contact. While this may provide some improvement in continuity, there is a limit to the increase surface area contact that can be obtained in an electrical connector or fitting. Therefore, there is a need for a different approach in obtaining improved continuity or conductivity between the electrical conductor or fitting, the electrical box, or the cable. This has been a particularly difficult problem for telescoping coupler assemblies that inherently must have sliding surfaces.

Therefore, there is a need for a telescoping coupler assembly with improved grounding, sealing, and continuity.

SUMMARY OF THE INVENTION

It is therefore an object of the present invention to provide a coupler assembly that has a coupler body with an inlet end portion arranged for telescopically receiving an electric metal tube in sliding relationship relative thereto and wherein the optimum desired amount of an electrical grounding is achieved.

Another object is to provide a telescoping coupler assembly having an arrangement for prohibiting the seepage of moisture into the coupler assembly and the relative telescoping members.

Another object is to provide a telescoping coupler assembly having a coupler body for slidably receiving an electric metal tube connected thereto that is positively electrically grounded to the coupler body.

Another object is to provide a telescoping coupler assembly for electrical metal tubes which is relatively simple in structure, easy to manufacture, positive in operation, and moisture proof.

It is another object of the present invention to improve continuity and lower voltage drop across an electrical fitting.

It is an advantage of the present invention that electrical grounding is made more reliable.

It is another advantage of the present invention that improved weather tight sealing is obtained while attaching or tightening an electric metal tube to the telescoping coupler assembly.

It is yet another advantage of the present invention that a lower voltage drop across an electrical fitting is obtained.

It is a feature of the present invention that an internal grounding cantered spring is used.

It is another feature of the present invention that a cam or ramp having a predetermined radial dimension range is placed adjacent a seal.

It is yet another feature of the present invention that a plating of high electrical conductivity material is formed on an internal grounding cantered spring.

The foregoing objects, advantages, and features are attained by a telescoping coupler assembly that includes a coupler body for securing an electrical metal tube to an electrical structure such as an electrical box or panel or for connecting at least a pair of electrical metal tubes in end-to-end relationship wherein at least one of the electric metal tubes is rendered movable relative to the other. The coupler body includes a bore extending therethrough to define opposed open ends. One open end of the coupler body may be adapted to be fixedly connected to an electric box, panel, or adapted to receive another electric metal tube. The other open end of the coupler body for receiving an electric metallic tube is sized and shaped to telescopically receive an end portion of the electric metal tube for relative sliding or telescoping movement with respect thereto. The end of the coupler body adapted for securing the coupler body to an electrical box or panel may be formed to accommodate a lock nut or a snap fit adaptor such as disclosed in U.S. Pat. Nos. 6,555,750, 6,737,584, 6,916,688, 6,935,891 or other like patents. Alternatively, each of the opposed ends of the coupler body may be formed to snugly receive an electric metal tube wherein one electric metal tube is fixedly secured to the coupler body by means of a fastener, and the other electric metal tube is telescopically mounted relative to the other end of the coupler body, as illustrated herein.

Connected adjacent to the end of the coupler body for receiving the telescoping tube is a grounding means that includes a grounding ring which is arranged to be slipped onto and fixedly secured to an end portion of the electric metal tube telescopically fitted into the corresponding open end of the coupler body.

The grounding ring is connected to the coupler body by a wire mesh grounding strap of a predetermined length sufficient to provide for the relative sliding or telescoping movement of the moveable electric metal tube relative to the coupler body. The arrangement is such that the moveable electric metal tube is positively electrically grounded to the coupler body throughout its entire range of movement to provide for optimal electrical grounding between the coupler body and the associated telescoping electric metal tube.

Disposed within the bore of the coupler body are sealing rings for rendering the coupler assembly moisture proof without seriously limiting the relative sliding relationship between the telescoping electric metal tube and the associated coupler body.

Additionally, a cantered grounding spring is placed around the internal circumferential surface of the coupler body providing internal electrical grounding and continuity between the coupler body and attached electric metal tube, rigid pipe, or other conductive conduits.

To improve continuity and lower the voltage drop across the coupler, the cantered grounding spring is plated or coated with a metal or alloy having high conductivity, such as tin or a tin alloy.

A ramp or cam placed within the coupler body adjacent a sealing ring or seal improves sealing when a set screw is used to secure the electrical metal conduit within an adjacent end. The ramp or cam centers the electrical metal conduit adjacent the seal so that a uniform circumferential sealing pressure is obtained.

BRIEF DESCRIPTION OF THE DRAWINGS

FIG. 1 is a perspective view of a telescoping coupler assembly for an electric metal tube embodying the present invention.

FIG. 2 is a perspective view of the coupler body, absent the moveable electric metal tubes.

FIG. 3 is a top view of FIG. 2.

FIG. 4 is a section view of the coupler body taken along line 4-4 on FIG. 3.

FIG. 9 is a perspective view illustration another embodiment of the coupler body of the present invention.

FIG. 10 is a cross sectional view taken along line 10-10 in FIG. 9.

FIG. 11 is a partial cross sectional view of one end of the coupler body.

FIG. 12 is a partial cross sectional view of one end of the coupler body illustrating the operation of the cam or ramp.

FIG. 13 is a partial cross sectional view of the other end of the coupler body illustrating the cantered grounding spring.

FIG. 14 is a partial cross sectional view of the other end of the coupler body illustrating the electrical coupling of the cantered grounding spring with the electric metal tube.

FIG. 16 is a partial cross section of one end of the embodiment illustrated in FIG. 15 illustrating use with threaded rigid electric metal pipe.

FIG. 17 is a partial cross section of the other end of the embodiment illustrated in FIG. 15 illustrating use with threaded rigid electric metal pipe.

FIG. 18 is a partial cross sectional view of another embodiment of the invention illustrating the end of a coupler body having a cantered grounding spring plated or coated with a high conductivity material.

FIG. 19 is an enlarged cross section of the coated or plated cantered grounding spring illustrated in FIG. 18.

FIG. 20 is a partial cross sectional view of the embodiment illustrated in FIG. 18 of the invention illustrating the electrical coupling of the coated or plated cantered grounding spring with the electric metal tube.

DETAILED DESCRIPTION OF THE PREFERRED EMBODIMENTS

Figure 5:
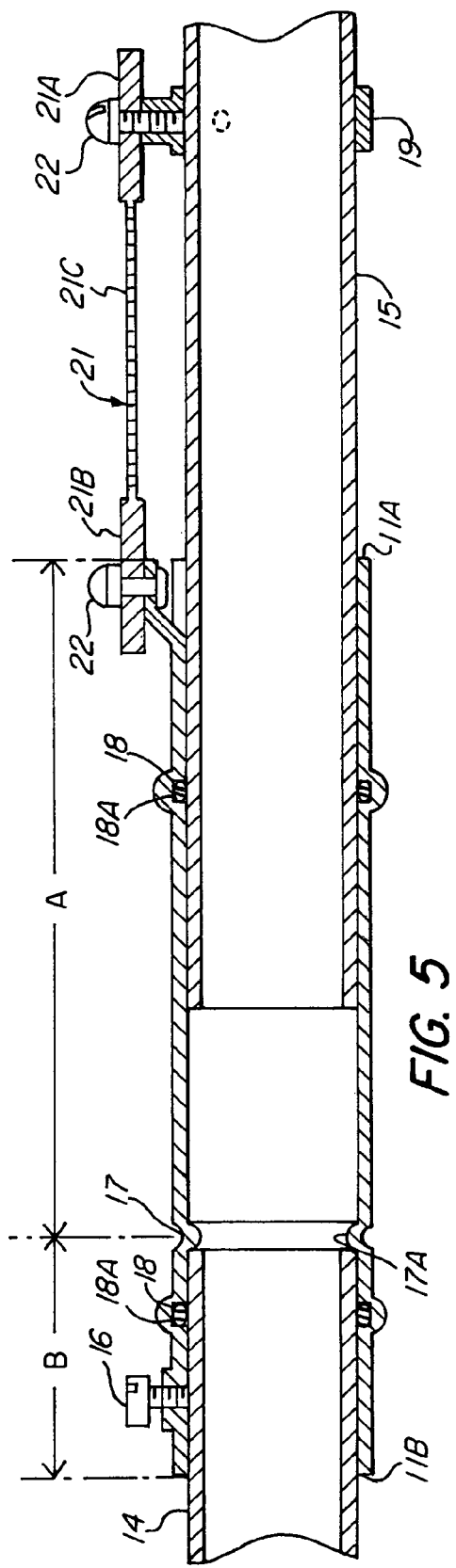
FIG. 5 is a longitudinal sectional view of the coupler assembly of FIG. 1.

Referring to the drawings there is illustrated in FIG. 1 a telescoping coupler assembly 10 embodying the invention. As shown, the coupler assembly 10 includes a coupler body 11 comprising an elongated tube or cylinder of a predetermined length defining a bore 13 extending therethrough that is opened at the opposed ends 11A, 11B of the coupler body 11. In the illustrated embodiment of FIG. 1 the coupler body 11 is configured to connect at least two electric metal tubes 14 and 15 in end-to-end relationship wherein one electric metal tube, e.g. tube 14, is arranged to be received within the end opening 11B of the coupler body 11 and fixedly secured thereto by means of suitable fasteners e.g. one or more set screws 16. The other electric metal tube 15 is adapted to be slidably received within the other open end 11A of the coupler body 11. The arrangement is such that tube 15 is rendered slidably or telescopically mounted within the open end 11A of the coupler body 11 to accommodate any protracting or retracting movement of the electric metal tube 15 relative to the coupler body 11 or the other electric metal tube 14 fixedly connected to the coupler body 11.

As best seen in FIG. 4, the coupler body 11 is provided with a circumscribing inwardly projecting external groove 17 to define an internal stop shoulder 17A. The shoulder stop 17A functions to limit the distance that the fixed tube 14 may be inserted into the open end 11B of the coupler body 11 as noted in FIG. 5. As shown in FIG. 5, the stop shoulder 17A is located along the length of the coupler body 11 at a point closer to the end opening 11B than to end opening 11A. The arrangement is such that the longer portion A of the coupler body 11 to the right of the stop shoulder 17A has a length sufficient for the electric metal tube 15 to be telescopically mounted relative thereto so as to be slidably displaced therein as the tube 15 telescopes relative to the coupler body 11 so as to not allow the movable tube 15 to separate from the coupler body 11.

To prohibit any moisture or water from entering into the coupler assembly and the tubes connected thereto, the coupler body is provided with end seals 18-18. As shown at least two such end seals 18-18 are provided, one to either side of the stop shoulder 17A.

The seat 18A for accommodating the respective seals 18-18 is defined by a circumscribing internal grove 18A which is formed in any suitable manner, e.g. by swedging, pressure rolling or molding to deform the material of the coupler body as illustrated in FIG. 5. While the illustrated embodiment of FIG. 5 is described as having one seal 18 on opposite sides of the internal stop 17A, it will be understood that the number of such seals may be varied as required.

As shown in FIG. 1, the insertion of electric metal tube 14 into the opened end 11B of the coupler body 11 is limited by the internal stop 17A. With the tube 14 properly seated in the open end 11B of the coupler body 11, the tube 14 is fixedly secured thereto by means of a suitable fastener, e.g. set screw 16.

The slidable or telescoping tube 15 is inserted into the other open end 11A of the coupler body 11. The length A of the coupler body 11 is sufficient to permit tube 15 to be slidably disposed relative thereto without causing the tube 15 to be separated therefrom. In other words, the length A of the coupler body is greater than the maximum permitted linear displacement of the tube 15 within the coupler body 11.

Because tube 15 is slidably disposed within the coupler body 11, the coupler body is provided with a means for insuring the maximum optimizing of a positive electrical ground between telescoping tube 15 and the coupling body 11. In the illustrated embodiment, this is attained by a grounding ring 19 which is sized and shaped so as to be snugly fitted onto an end portion of the slidable or telescoping tube 15. Suitable fasteners such as set screws 20 fixedly secure the grounding ring 19 to the telescoping metal tube 15.

A grounding strap 21 connects the grounding ring 19 to the coupler body 11. A mounting plate 21A and 21B is connected to each end of the grounding strap 21 to provide the means whereby the grounding strap 21 is securely fixed to the grounding ring 21 and coupler body 11 by suitable fasteners, such as bolts or screws 22-22. Preferably the grounding strap portion 21C connected between the opposed end mounting plates 21A and 21B comprises a woven wire mesh strap 21C that renders the grounding strap 21 flexible for accommodating the telescoping or sliding movement of tube 15 relative to the coupler body 11. Thus the grounding strap 21 is free to flex or stretch in accordance with the linear or telescoping displacement of the electric metal tube 15 as the tube 15 telescopes or slides relative to the coupler body 11. In doing so, the grounding effect of the movable tube relative to the coupler body 11 is maximized throughout the entire telescoping range of the coupler assembly.

By providing seals 18 between the coupler body 11 and the respective associated electric tubes 14 and 15, the coupler assembly 10, described, also prohibits moisture or water from seeping into the coupler assembly 10 and the electrical tubes 14, 15 associated therewith.

While the embodiments illustrate the coupler body 11 having opposed end openings 11A, 11B of substantially equal diameters, it will be understood that the coupler body 11 may have opposed end openings with different sized diameters for connecting electric metal tubes of corresponding different diameters in end-to-end relationship.

It will also be noted that the short end B of the connector body 11 may be formed for accommodating a snap fit locking ring (not shown) of the type disclosed in U.S. Pat. Nos. 6,555,750, 6,737,584, 6,860,758, 6,935,891 and 6,916,988 and the like whereby one end of the coupler body 11 may be formed to be snap fitted or secured to an electronic box or panel in the manner described in the foregoing noted U.S. Patents which are incorporated by reference herein in the event it is desirable to couple a telescoping electric metal tube directly to an electric box or panel.

With the foregoing described structures it will be noted that the electrical grounding effect between the telescoping electric metal tube 15 and the coupler body 11 is rendered more positive than simply relying merely upon the sliding motion of the telescoping metal tube relative to the coupler body to produce the electrical ground effect, which may be problematic due to a space tolerance required between the sliding tube and the coupler body.

Figure 7:
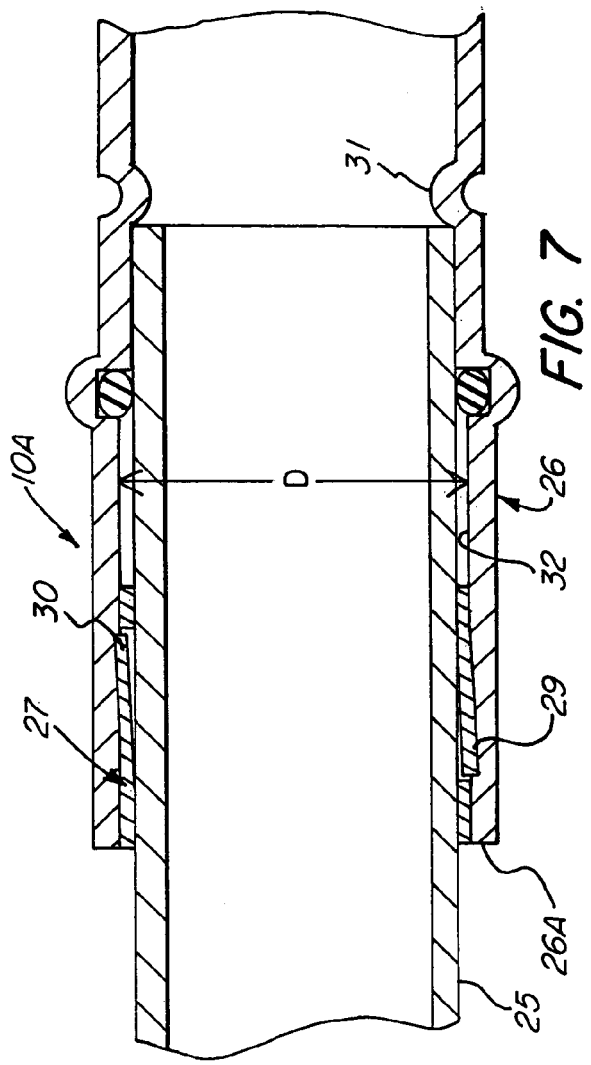
FIG. 7 is a fragmentary sectional view of a modified form of the invention utilizing the modified tube retainer of FIG. 6 wherein the limiting tang and retainer tang are shown in their operative positions.
Figure 6:
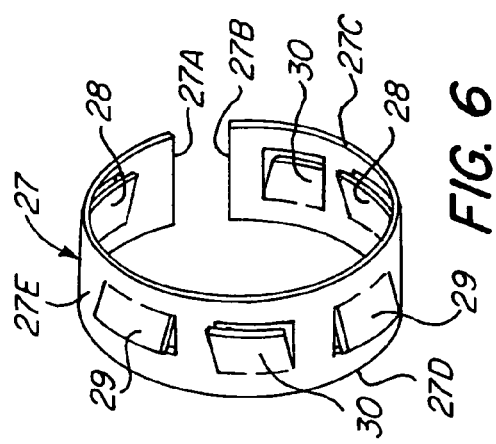
FIG. 6 is a detail perspective view of a modified tube retainer for fixedly securing an electric metal tube to the coupler body.
Figure 8:
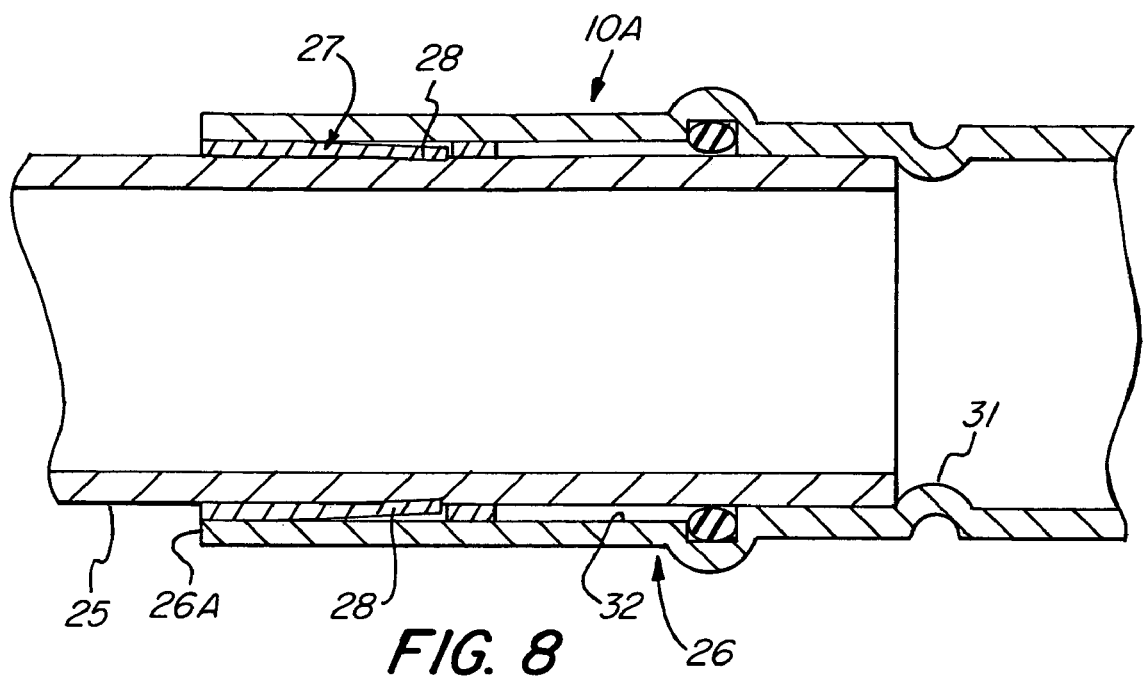
FIG. 8 is a sectional view similar to FIG. 7, wherein the tube retaining tang is shown in the operative position.

FIGS. 6 and 7 are directed to a modified form of the invention. The coupler assembly 10A is similar to the coupler assembly 10 herein described with the exception that the means for fixedly securing the fixed electric metal tube 25 to the coupler body 26 is achieved by a retainer ring 27 constructed to permit the fixed tube 25 to be snap fitted into one end 26A of the coupler body 26 that will also resist any unintentional separation of the fixed tube 25 from the coupler body 26 by an unintentionally applied force tending to cause separation of the fixed tube 25 from the coupler body 26.

As illustrated in FIG. 6, the retaining ring 27 is preferably formed of spring steel with a circular configuration capable of being inserted into the end opening 26A of the coupler body 26. In the illustrated embodiment, the retaining ring 27 has its opposed ends 27A and 27B slighted spaced apart to form a split ring. As the material of the retainer ring 27 is formed of spring steel, the described retainer ring 27 has an inherent resiliency which in its relaxed state is provided with an outer diameter that is slightly greater than the internal diameter D of the open end 26A of the coupler body 26.

Referring to FIG. 6, the split ring retainer 27 is provided with a leading edge 27C, a trailing edge 27D, and a plane surface 27E therebetween. Blanked or formed out of the plane surface 27E are one or more tube retaining tangs, 28, one or more locking tangs 29, and one or more limit tangs 30. As shown in FIG. 6 the tube retaining tangs 28, the locking tangs 29 and limit tangs 30 are alternating and circumferentially spaced about the circumference of the retaining ring 27.

The tube retaining tangs 28 are inwardly bent out of the plane surface 27E and are inclined or angled in the direction of the leading edge 27A of the retainer ring 27. The locking tangs 29 are outwardly bent relative to the plane surface 27E of the retainer ring 27 and are oppositely inclined or angled toward the trailing edge 27D of the retainer ring 27. The limit tangs 30 are also blanked or formed out of the plane surface and outwardly bent relative to the plane surface 27E and are angled or inclined toward the leading edge of the retaining ring 27.

As illustrated in FIG. 7, the retainer ring 27 being split may be compressed to permit the retainer ring 27 to be inserted into the open end 26A of the coupler body 26. The arrangement is such that with the retainer ring in its compressed state when inserted into the end opening 26A, will cause the outwardly bent limit tang 30 to engage an internal surface portion of the coupler body upon the removal of the compressing force thereon to limit the distance the retainer ring 27 may be inserted into said end opening 26A.

Upon releasing the compression force acting on the retainer ring 27, the inherent resiliency of the split retainer ring 27 will cause the diameter of the retainer ring 27 to expand with a sufficient force to fixedly secure the retainer ring 27 within the end opening 26A whereby the outwardly bent locking tangs 29 will impart an additional "bite" force against the inner surface of the end opening to resist any unintentional pull out force that may be applied on the retainer ring.

With the retainer ring 27 frictionally secure within the open end 26A of the connector body 26, as above described, the arrangement is such that the electric metal tube 25 can be fixedly secured to the end opening 26A of the coupler body 26 by simply pushing the end portion of electric tube 25 into the end opening 26A and through the retainer ring 27 until the end of the tube 25 engages the internal stop 31. As the end of the electric metal tube 25 passes through the retainer ring 27 the tube retaining tangs 29, which are inwardly bent as described herein, will inherently exert a holding or biting force on the electric metal tube sufficient to resist an unintentional pulling force imparted onto the electric metal tube 25. In all other respects, the embodiment disclosed and described with the embodiment of FIGS. 6 and 7 is similar to the embodiments herein before described with respect to FIGS. 1 to 5.

The locking tangs 29, being outwardly bent, are sufficiently resilient so as to flex inwardly permitting the retainer ring to also pass through the end opening 26 of the coupler body 26 and spring outwardly, when ring 27 is fully seated, to bite into the internal surface of the bore of the coupler body to resist or prohibit unintentional separation of the retaining ring 27 from the coupler body in the assembled position.

With the retainer ring 27 described, installation of the electric metal tube 25 to the coupler body 26 may also be effected by positioning the retaining ring 27 onto the end of the electric metal tube 25, and then inserting the electric metal tube with the retainer ring 27 secured thereto into the end opening 26A of the coupler body 26 until the end of the tube engages the stop shoulder 30 as noted in FIG. 7. In this assembled position, as seen in FIG. 7, the tube retaining tangs 28, which are inwardly bent and inclined in the direction of the leading edge 27C of the retaining ring 27, are bias to exert a biting force onto the metal tube 26 with a force sufficient to prohibit unintentional separation of the tube 25 therefrom. At the same time the outwardly bent locking tangs 29, inclined in the direction of the trailing edge 27D, will exert a biting force onto the internal surface of the bore 32 to resist unintentional withdrawal of the retainer ring 27 and the associated tube 25 from the open end 26A of the coupler body 26.

FIGS. 9-17 illustrate another embodiment of the present invention. This embodiment of the present invention utilizes an internal cantered grounding spring. The coupler body 111 has a first opposed end 111A and a second opposed end 111B. Adjacent the second opposed end 111B are set screws 116. Adjacent the first opposed end 111A is attached an end mounting plate 121B attached to the coupler body 111 by screw or bolt 122. Attached to the end mounting plate 121B is a grounding strap 121. The grounding strap 121 is attached to grounding ring 119 by end mounting plate 121A and screw or bolt 122. Also attached to the grounding ring 119 are set screws 120.

FIG. 10 more clearly illustrates the improvements in this embodiment of the present invention that make for better sealing or weatherproofing and enhanced grounding. FIG. 10 is a cross section of the coupler body 111 that more clearly illustrates the improvements in this embodiment. In this embodiment the coupler body 111 has several structural enhancements to provide improved performance. To provide improved sealing or weatherproofing, the internal shoulder 117A is utilized having a ramp or cam 117B. The ramp or cam 117B is facing and adjacent the second opposed end 111B. A seal 118, which may be an O-ring of a pliable material such as rubber or silicone or other equivalent flexible or compressible material, is placed within an internal circumferential grove 118A. The seal or sealing ring 118 is placed adjacent the ramp or cam 117B facing towards the open second opposed end 111B. An external grove 117 may be used to identify the position of the internal shoulder 117A from the exterior of the coupler body 111.

The ramp or cam 117B greatly facilitates the centering of an electric metal tube placed within the second opposed end 111B. Accordingly, this improved structure prevents leakage and improves the weather-tight seal of the telescoping coupler assembly.

Adjacent the other first opposed end 111A is another seal or sealing ring 118 held within another internal circumferential groove 118A which is adjacent an internal grounding spring groove 131A. Within the internal grounding spring groove 131A is a cantered grounding spring 131. The cantered grounding spring 131 has the helical coils of the spring cantered, or angled, relative to the perimeter of the spring so that the spring is compliant or compressible in the radial direction. The grounding spring 131 is preferably copper so as to be electrically conductive and provides electrical continuity or grounding to the coupler body 111 and an electrical metal tube placed within the coupler body 111.

Accordingly, as illustrated in FIG. 10, the telescoping coupler assembly has internal grounding through the grounding spring 131 and external grounding through the grounding strap 121. Therefore, should the external grounding strap 121 be compromised or severed, for whatever reason, the internal grounding spring 131 will provide adequate grounding. Accordingly, the present invention by providing an internal cantered grounding spring 131 provides enhanced or additional electrical grounding.

FIGS. 11 and 12 more clearly illustrate the improved sealing or weather-tight feature of the present invention. In FIG. 11 the ramp or cam 117B positioned between the internal shoulder 117A and the seal or sealing ring 118 is more clearly illustrated. The ramp or cam 117B has a larger diameter 117C and a smaller diameter 117D. The distance between the diameters or radial height between 117C and 117D is selected to be in the range of the radial dimensional tolerances of an electrical metal tube 114 intended to be placed within the second opposed end 111B. The positioning of the seal or sealing ring 118 adjacent the ramp or cam 117B greatly improves the ability of the telescoping coupler assembly 111 to be sealed so as to be weatherproof or weather-tight and more fully assures that a uniform seal is formed around the entire outer circumference of the electric metal tube 114. This is especially important when the set screws 116 are tightened to securely hold the electric metal tube 114 in position. As the set screws 116 are tightened they tend to force the portion of the electric metal tube 114 adjacent the set screw 116 to be non-concentric within the coupler body 110. Without the ramp or cam feature of the present invention, this may result in an uneven gap circumferentially formed around the electric metal tube 114 making it difficult to seal or resulting in an unreliable seal. However with the ramp or cam 117B placed adjacent the seal or sealing ring 118, at least in the portion of the electric metal tube 114 adjacent the seal or sealing ring 118 the gap formed around the external surface of the electric metal tube 114 will be substantially uniform and therefore provide a much improved uniform seal less prone to leakage. The end of the pipe 114A will be wedged at a point longitudinally or axially along the ramp or cam 117B. If the external diameter of the electric metal tube 114 is at the low end of the design specification, the end 114A of the electric metal tube 114 will be nearly adjacent the internal shoulder 117A. When the external diameter of the electric metal tube 114 is at the larger end of the design specification, the end 114A of the electric metal tube 114 will come to rest closer to the larger diameter 117C of the ramp or cam 117B and closer to the seal or sealing ring 118. Accordingly, by providing a uniform spacing adjacent the seal or sealing ring 118 improved sealing and weatherproofing is obtained with little likelihood of leakage.

FIGS. 13-14 illustrate the enhanced grounding feature of the present invention. FIGS. 13-14 more clearly illustrate the structure and function of the internal grounding feature of this embodiment of the present invention.

FIG. 13 more clearly illustrates the cantered electrical grounding spring 131 retained within the internal grounding spring groove 131A. The electrical grounding spring 131 forms a circle or ring of helical coils. The helical coils of the grounding spring 131 are cantered or angled so as to make them readily compliant in the radial direction. The helical coils of the grounding spring 131 are in a plane that is angled relative to the radial direction of the circle or loop formed by the helical coils. Accordingly, when a radial pressure is applied to the cantered grounding spring 131 the helical coils comply in the radial direction to maintain continuous contact with the inserted electric metal tubing.

FIG. 14 illustrates the placement of an electric tube 115 within the first opposed end 111A so as to compress the cantered grounding spring 131. Accordingly, the cantered grounding spring 131 creates an electrical grounding connection between the electric metal tube 115 and the coupler body 111. Therefore, this embodiment of the present invention provides both internal and external grounding. This improves safety and enhances overall grounding of the telescoping coupler assembly. Therefore, should the external grounding strap be severed or removed, the internal grounding will prevent an electrical grounding fault or discontinuity.

Figure 15:
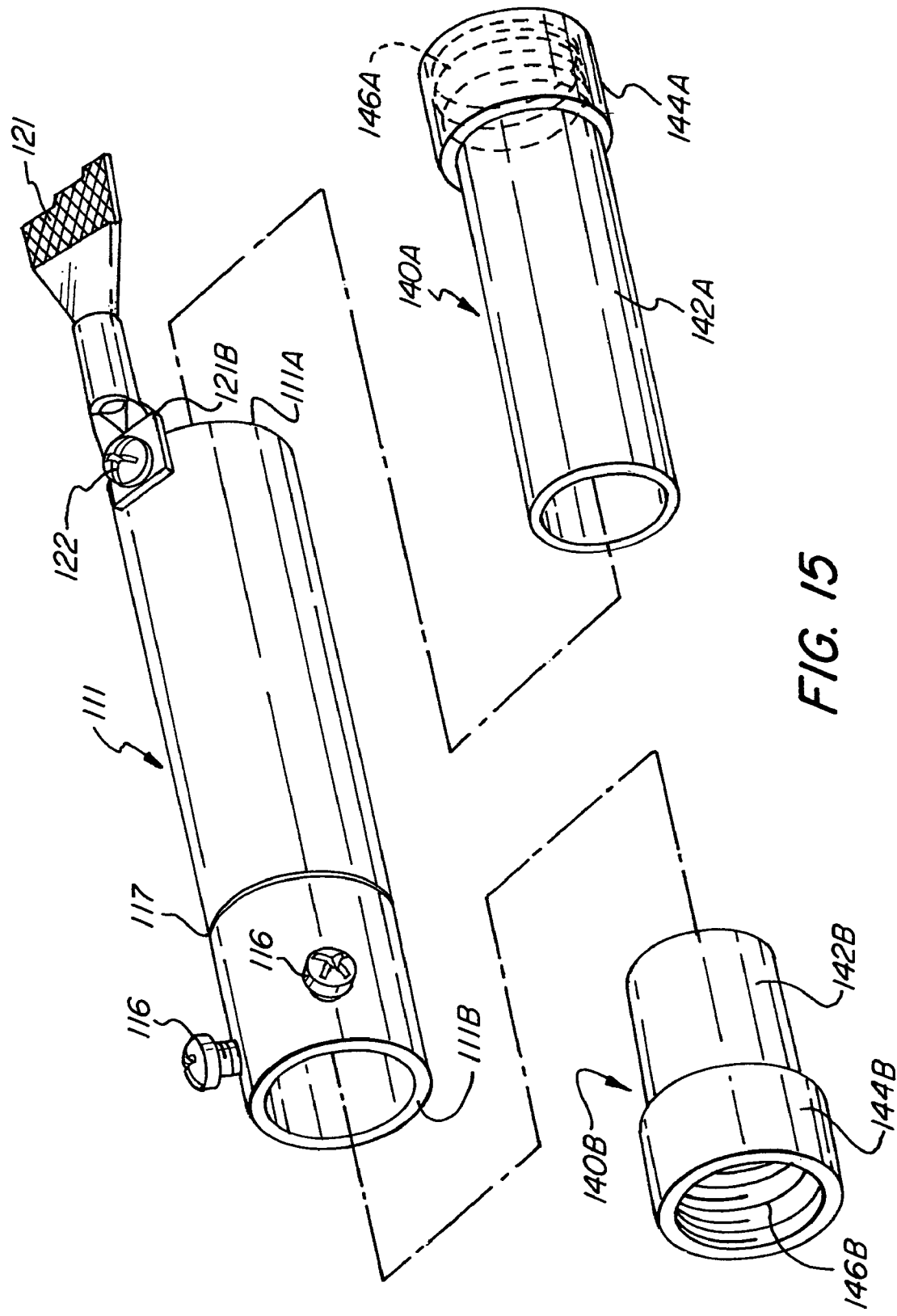
FIG. 15 is a partial exploded view illustrating another embodiment of the present invention adapted for use with threaded rigid electric metal pipe.

FIG. 15-17 illustrates another embodiment of the present invention that is adapted to mate with electric rigid pipe that is threaded. In FIG. 15 a sliding rigid pipe adaptor 140A has a sliding insert end 142A adapted to be inserted into the first opposed end 111A. A threaded end 114A has female threads 146A therein. The female threads 146A are adapted to mate and thread onto the male threads of a rigid pipe. Fixed rigid pipe adapter 140B has a fixed insert end 142B adapted to be inserted within the second opposed end 111B of the coupler body 111 and fixed therein by set screw 116. Threaded end 144B has female threads 146B adapted to receive the male threads of a rigid pipe. When the fixed rigid pipe adaptor 140B is placed within the second opposed end 111B the set screws 116 are tightened, securely holding the fixed rigid pipe adaptor therein. Similarly, the sliding rigid pipe adaptor 140A is placed within the first opposed end 111A and slidably retained therein. In this embodiment the telescoping coupler assembly is adapted to be used with threaded rigid electric pipe that is used as a conduit to contain electric wires.

FIG. 16 illustrates an end of the coupler body 111 holding the fixed rigid pipe adaptor 140B with female threads 146B inserted into the opposed end 111B. The fixed rigid pipe adaptor 140B is held securely in place by a set screw 116, fastener, or other equivalent means for fixedly securing a metal tube. A rigid electric pipe 148 having male threads 150 is illustrated mating with the fixed rigid pipe adaptor 140B.

FIG. 17 illustrates the other end of the coupler body 111 holding sliding rigid pipe adaptor 140A with the threaded end 146A. Threaded within the threaded end 146A is rigid electric pipe 152 having male threads 154. The grounding ring is attached to the external grounding strap and end mounting plate 121B may be attached to the sliding rigid pipe adaptor 140A or the rigid electric pipe 152 depending upon the length of the sliding rigid pipe adaptor 140A. The sliding rigid pipe adaptor 140A is internally grounded by the grounding spring 131.

Accordingly, this embodiment of the present invention provides for an improved and enhanced telescoping coupler assembly that has improved weatherproofing and grounding. Even when the external grounding strap 121 is severed or removed, the internal grounding spring 131 remains in grounding contact providing electrical continuity for grounding.

FIGS. 18-20 illustrate another embodiment of the present invention. In this embodiment electrical continuity is enhanced. This embodiment is similar to the embodiment illustrated in FIGS. 13 and 14 except that cantered grounding spring 231 is plated with a metal or alloy 232 having high conductivity, such as tin or a tin alloy. The copper or copper alloy cantered grounding spring 231 is plated with a metal having electrical conductivity higher than the electric metal tube or coupler body and preferably higher than zinc, such as and preferable tin or a tin alloy. The plating of a high conductivity metal on the cantered grounding spring 231 is preferably formed on the entire surface. The tin plate or plating may be a matte or bright finish and preferable has a thickness of between 0.00015 and 0.00030 inches, or between 0.0381 and 0.0762 millimeters. The tin plating may be electrodeposited using standard techniques, such as per ASTM B545 (Type I) standards. Different high conductivity metals and tin or tin alloys may be used, such as tin-zinc, tin-lead, or tin-nickel. Tin has a much higher conductivity than zinc, and is similarly corrosion resistant. Additionally, high conductivity metals other tin or tin alloys may be used such as silver or gold. The plating of the copper cantered grounding spring 232 substantially improves the conductivity and continuity of the telescoping coupler assembly. Corrosion is also reduced which may adversely affect continuity.

The reduced surface area contact and the lower contact pressures of the cantered grounding spring in the telescoping coupler assembly versus a non-telescoping coupler assembly often results in lower continuity and increased voltage drop across the coupler assembly. Typically, there are electrical standards, such as Underwriters Laboratory or UL standards, that have a maximum permitted voltage drop across an electrical fitting, such as a coupler assembly. These standards assure for a safe electrical connection that is adequately bonded or grounded. In experiments using a copper alloy spring that was bright tin plated, a voltage drop across the telescoping coupler of only 6 mV or lower was obtained. The appropriate Underwriters Laboratories specification, UL 514B, requires less than a 10 mV voltage drop.

While the terms bonding and grounding or often used synonymously, the present invention is more accurately directed to electrical bonding. The National Electric Code defines bonding as a low impedance path obtained by securely joining all non-current carrying metal parts to assure electrical continuity and having the capacity to conduct safely any current likely to be imposed upon it and defines grounding as a permanent and continuous conducting path to the earth with sufficient ampacity to carry any fault current liable to be imposed upon it, and of sufficiently low impedance to limit the voltage rise above ground and to facilitate the operation of the protective devices in the circuit. Therefore the present invention improves continuity of telescoping coupler assemblies that may be applied to either electrical bonding or grounding. The present invention quite surprisingly results in a substantial decrease in voltage drop across the telescoping coupler assembly. As a result continuity of the telescoping coupler assembly is improved resulting in a telescoping coupler assembly having better electrical properties.

While the invention has been described with respect to the different embodiments, other variations and modifications can be made without departing from the spirit or scope of the invention.

What is claimed is:

1. A telescoping electric metal tube coupler assembly comprising:
   a coupler body having a bore extending therethrough and having first and second opposed end openings adapted to receive an electric metal tube;
   a first seal placed adjacent the first opposed end opening;
   an internal circumferential groove placed in said coupler body adjacent said first seal;
   a grounding spring comprising canted helical coils placed within said internal circumferential groove, whereby said grounding spring having canted helical coils is compliant permitting the electric metal tube to telescope within said coupler body and provide electrical continuity between said coupler body and the electric metal tube;
   a metal plating placed on said grounding spring; and
   a second seal placed adjacent the second opposed end opening,
   whereby said metal plating improves continuity and lowers voltage drop across the electric metal tube coupler.

2. An electric metal tube coupler as in claim 1 wherein:
   said metal plating has an electrical conductivity higher than the material of the electric metal tube.

3. An electric metal tube coupler as in claim 1 wherein:
   said metal plating comprises tin.

4. An electric metal tube coupler as in claim 1 wherein:
   said metal plating comprises tin alloy.

5. An electric metal tube coupler as in claim 1 wherein:
   said metal plating is selected from the group consisting of tin, tin-zinc alloy, tin-lead alloy, tin-nickel alloy, silver, and gold.

6. An electric metal tube coupler as in claim 1 wherein:
   said metal plating has a thickness ranging between 0.00015 and 0.00030 inches or between 0.0381 and 0.0762 millimeters.

7. An electric metal tube coupler as in claim 1 wherein:
   said grounding spring comprises copper.

8. An electric metal tube coupler assembly comprising:
   a coupler body having a bore extending therethrough and having first and second opposed end openings adapted to receive an electric metal tube;
   a first seal placed adjacent the first opposed end opening;
   an internal circumferential groove placed in said coupler body adjacent said first seal;
   a grounding spring placed within said internal circumferential groove;
   a metal plating placed on said grounding spring;
   a second seal placed adjacent the second opposed end opening;
   a grounding ring connected to said electric metal tube, and a flexible grounding strap interconnecting said grounding ring to said coupler body,
   whereby the metal tube coupler is grounded externally by said flexible grounding strap and internally by said grounding spring having said metal plating improving continuity and lowering voltage drop across the electric metal tube coupler providing enhanced electrical grounding and continuity.

9. An electric metal tube coupler assembly comprising:
   a coupler body having a bore extending therethrough and having opposed end openings,
   an electric metal tube, said electric metal tube having an end portion adapted to be slidably received in one of the opposed end openings and having a first electrical conductivity,
   an inwardly extending stop means disposed within the bore between the opposed end openings,
   sealing means disposed in the one of the opposed end openings circumscribing the end portion of said electric metal tube slidably disposed within the one of the opposed end openings,
   a grounding spring groove formed in the interior surface of said coupler body adjacent said sealing means,
   a grounding spring placed within said grounding spring groove,
   a metal plating formed on said grounding spring, said metal plating having a second electrical conductivity higher than the first electrical conductivity,
   a grounding ring connected to said electric metal tube, and
   a flexible grounding strap interconnecting said grounding ring to said coupler body,
   whereby the metal tube coupler is grounded externally by said flexible grounding strap and internally by said grounding spring providing enhanced electrical grounding and continuity.

10. An electric metal tube coupler assembly as in claim 9 wherein:
    said metal plating comprises tin.

11. An electric metal tube coupler assembly as in claim 9 wherein:
    said metal plating comprises tin alloy.

12. An electric metal tube coupler assembly as in claim 9 wherein:
    said metal plating is selected from the group consisting of tin, tin-zinc alloy, tin-lead alloy, tin-nickel alloy, silver, and gold.

13. An electric metal tube coupler assembly as in claim 9 wherein:
    said metal plating has a thickness ranging between 0.00015 and 0.00030 inches or between 0.0381 and 0.0762 millimeters.

14. A telescoping coupler assembly for coupling electric metal tubes or pipes comprising:
    a coupler body having a bore extending therethrough and having first and second opposed end openings adapted to receive a metal tube, said coupler body having a first electrical conductivity;
    a first seal placed adjacent the first opposed end opening;
    a grounding spring groove formed in the interior surface of said coupler body adjacent said first seal;
    a canted grounding spring placed within said grounding spring groove;
    a metal plating formed on said canted grounding spring, said metal plating having a second electrical conductivity higher than the first electrical conductivity of said coupler body,
    a grounding ring, whereby said grounding ring is capable of connecting to an electric metal tube;

a flexible grounding strap electrically interconnecting said grounding ring to said coupler body;

an internal shoulder formed within said coupler body;

a ramp adjacent said internal shoulder facing the second opposed end;

a second seal placed adjacent said internal shoulder; and means, adjacent the second opposed end, for fixedly securing a metal tube to the second opposed end, whereby the telescoping coupler assembly is grounded externally by said flexible grounding strap and internally by said canted grounding spring providing enhanced electrical grounding and continuity and said ramp centers the metal tube within said coupler body adjacent said second seal.

15. A telescoping coupler assembly for coupling electric metal tubes or pipes as in claim 14 wherein:

said metal plating is selected from the group consisting of tin, tin-zinc alloy, tin-lead alloy, tin-nickel alloy, silver, and gold.

16. A telescoping coupler assembly for coupling electric metal tubes or pipes as in claim 15 further comprising:

a sliding rigid pipe adaptor placed within the first opposed end opening; and a fixed rigid pipe adaptor placed within the second opposed end opening.

* * * * *